US006675375B1

(12) United States Patent
Czajkowski

(10) Patent No.: US 6,675,375 B1
(45) Date of Patent: Jan. 6, 2004

(54) METHOD AND APPARATUS FOR OPTIMIZED MULTIPROCESSING IN A SAFE LANGUAGE

(75) Inventor: Grzegorz Czajkowski, Mtn View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/561,363

(22) Filed: Apr. 28, 2000

(51) Int. Cl.$^7$ ................................................. G06F 9/45
(52) U.S. Cl. ........................ 717/151; 717/140; 717/148; 717/152; 717/166; 717/118; 717/136; 712/202; 707/1
(58) Field of Search ................................ 717/108, 111, 717/118, 143, 148, 151, 159, 166, 178, 154, 140, 152, 162, 190; 707/2, 7, 101, 103, 103 R; 712/202

(56) References Cited

U.S. PATENT DOCUMENTS

| | | | | |
|---|---|---|---|---|
| 5,815,718 A | * | 9/1998 | Tock | 717/166 |
| 5,857,093 A | * | 1/1999 | Bradford | 703/21 |
| 5,909,579 A | * | 6/1999 | Agesen et al. | 717/131 |
| 5,953,526 A | * | 9/1999 | Day et al. | 717/108 |
| 5,966,702 A | * | 10/1999 | Fresko et al. | 707/1 |
| 5,999,732 A | * | 12/1999 | Bak et al. | 717/148 |
| 6,026,237 A | * | 2/2000 | Berry et al. | 717/130 |
| 6,026,485 A | * | 2/2000 | O'Connor et al. | 712/226 |
| 6,061,717 A | * | 5/2000 | Carleton et al. | 709/205 |
| 6,081,665 A | * | 6/2000 | Nilsen et al. | 717/116 |
| 6,098,089 A | * | 8/2000 | O'Connor et al. | 709/104 |
| 6,125,439 A | * | 9/2000 | Tremblay et al. | 712/202 |
| 6,158,048 A | * | 12/2000 | Lueh et al. | 717/118 |
| 6,226,788 B1 | * | 5/2001 | Schoening et al. | 717/107 |
| 6,247,171 B1 | * | 6/2001 | Yellin et al. | 717/126 |
| 6,330,709 B1 | * | 12/2001 | Johnson et al. | 717/100 |
| 6,338,160 B1 | * | 1/2002 | Patel et al. | 717/139 |
| 6,427,234 B1 | * | 7/2002 | Chambers et al. | 717/140 |

OTHER PUBLICATIONS

Alfred Aho, Compilers Principles, Techniques, and Tools, 1986, Addison–Wesley, pp. 394, 411, 438–440, 451, 474–479.*
Jon Meyer, Java Virtual Machine, Mar. 1997, O'Reilly & Associates, pp. 178–179.*
Title: Excape analysis for object–oriented languages: application to Java, author: Bruno Blanchet, ACM Sigplan, Oct., 1999.*
Title: SASI enforcement of security policies: a retrospective, author Erlingsson et al , ACM, Sep. 1999.*
TITLE: Compatible Genericity with Run–Time Types for the JAVA Programming Language, author: Cartwright et al, ACM, 1998.*
TITLE: Scaling up Partial Evaluation for Optimizing the Sun Commercial RPC Protocol, author: Muller eta l, ACM, 1997.*
TITLE: JAVA Annootation–Aware Just In Time Compilation System, author: Azevedo et al, ACM, 1999.*
Title: Implementations of Real–time Garbage collection in Java, author: Ive, 1999.*
Title: Annotation aware Java Virtual Machine Implementation, Azevedo et al, Acm, 1999.*

* cited by examiner

Primary Examiner—Chameli C. Das
(74) Attorney, Agent, or Firm—Rosenthal & Osha L.L.P.

(57) ABSTRACT

In general, the invention relates to a method for optimized execution of a computer program including detecting a preservable static field in said computer program with a compiler, comprising detecting at least one selected from the group consisting of a getstatic instruction and a putstatic instruction, annotating said preservable static field to create an annotation indicating whether said field is preservable, compiling said computer program to produce an output using said annotation, wherein said output includes information about said field, encoding said output if backward compatibility is required, loading said output, and executing said output in an environment.

12 Claims, 7 Drawing Sheets

METHOD AND APPARATUS FOR OPTIMIZED MULTIPROCESSING IN A SAFE LANGUAGE

BACKGROUND OF THE INVENTION

1. Field of the Invention

The present invention relates to optimized multiprocessing in a safe language, and in particular to an optimizing, backward-compatible, compiler-linker-run time architecture for multiprocessing in a safe language, such as Java.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

With advancements in network technology, the use of networks for facilitating the, distribution of media information, such as text, graphics, and audio, has grown dramatically, particularly in the case of the Internet and the World Wide Web. One area of focus for current developmental efforts is in the field of multiprocessing of web applications. In addition to passive media content, such as HTML definitions, computer users or "clients" coupled to the network are able to access or download application content, in the form of applets, for example, from "servers" on the network.

To accommodate the variety of hardware systems used by clients, applications or applets are distributed in a platform-independent format such as the Java.RTM. class file format. Object-oriented applications are formed from multiple class files that are accessed from servers and downloaded individually as needed. Class files contain bytecode instructions. A "virtual machine" process that executes on a specific hardware platform loads the individual class files and executes the bytecodes contained within.

In U.S. patent application entitled "Small memory footprint system and method for separating applications within single virtual machine," Ser. No. 09/513,291 filed on Feb. 25, 2000, Sun Microsystem assigned to the assignee of the present application, and hereby fully incorporated into the present application by reference, a method for optimized Java multiprocessing is described. In that invention, one is able to run multiple Java applications in the same Java virtual machine and introduce optimizations at load time and run time.

Java

A Java program is composed of a number of classes and interfaces. Unlike many programming languages, in which a program is compiled into machine-dependent, executable program code, Java classes are compiled into machine independent bytecode class files. Each class contains code and data in a platform-independent format called the class file format. The computer system acting as the execution vehicle contains a program called a virtual machine, which is responsible for executing the code in Java classes. The virtual machine provides a level of abstraction between the machine independence of the bytecode classes and the machine-dependent instruction set of the underlying computer hardware. Hence, Java provides an example of a safe language.

A "class loader" within the virtual machine is responsible for loading the bytecode class files as needed, and either an interpreter executes the bytecodes directly, or a "just-in-time" (JIT) compiler transforms the bytecodes into machine code, so that they can be executed by the processor. FIG. 1 is a block diagram illustrating a sample Java network environment comprising a client platform 102 coupled over a network 101 to a server 100 for the purpose of accessing Java class files for execution of a Java application or applet.

Sample Java Network Application Environment

In FIG. 1, server 100 comprises Java development environment 104 for use in creating the Java class files for a given application. The Java development environment 104 provides a mechanism, such as an editor and an applet viewer, for generating class files and previewing applets. A set of Java core classes 103 comprise a library of Java classes that can be referenced by source files containing other/new Java classes. From Java development environment 104, one or more Java source files 105 are generated. Java source files 105 contain the programmer readable class definitions, including data structures, method implementations and references to other classes. Java source files 105 are provided to Java compiler 106, which compiles Java source files 105 into compiled "class" files 107 that contain bytecodes executable by a Java virtual machine. Bytecode class files 107 are stored (e.g., in temporary or permanent storage) on server 100, and are available for download over network 101.

Client platform 102 contains a Java virtual machine (JVM) 111 which, through the use of available native operating system (O/S) calls 112, is able to execute bytecode class files and execute native O/S calls when necessary during execution.

Java class files are often identified in applet tags within an HTML (hypertext markup language) document. A web server application 108 is executed on server 100 to respond to HTTP (hypertext transport protocol) requests containing URLs (universal resource locators) to HTML documents, also referred to as "web pages." When a browser application executing on client platform 102 requests an HTML document, such as by forwarding URL 109 to web server 108, the browser automatically initiates the download of the class files 107 identified in the applet tag of the HTML document. Class files 107 are typically downloaded from the server and loaded into virtual machine 111 individually as needed.

It is typical for the classes of a Java program to be loaded as late during the program's execution as possible; they are loaded on demand from the network (stored on a server), or from a local file system, when first referenced during the Java program's execution. The virtual machine locates and loads each class file, parses the class file format, allocates memory for the class's various components, and links the class with other already loaded classes. This process makes the code in the class readily executable by the virtual machine.

In one prior art technique, the system transparently maintains a copy of the static fields for each application. Code for each method is shared among all applications, while static fields for each class are subject to automatic and transparent multiplexing. The effect of this invention is to allow for space efficient isolation among applications, reduced load and compilation times, and making the isolation between applications stronger than what class loader based Java multiprocessing could previously provide.

The above-referenced technique, however, creates problems of its own. Because multiple applications share static fields, concurrency problems arise. For instance, if application A accesses static field 1, and application B also accesses static field 1, the potential arises that application A may modify the data in static field 1, which is undesirable from a perspective of isolation. Application B expects static field 1 to be its own static field and may expect certain values from static field 1. If application A modifies this field, application B will see a modified value and have no understanding as to why it changed.

The above-referenced technique seeks to solve this problem by introducing optimizations at load time and run time which seek to protect such shared static fields in a multi-processing environment. Optimizations at load time and run time, however, introduce considerable overhead at a time critical point from the user's perspective, while the less time critical compilation phase remains relatively unaffected. A method and apparatus is needed to target the optimal points in the compiler-loader-run time path to allocate the optimization work.

SUMMARY OF THE INVENTION

The present invention provides a method and apparatus for optimized multiprocessing in a safe language by targeting the optimal points in the compiler-loader-run time path to allocate the optimization work. One or more embodiments provide for the optimized execution of multiple processes in a single Java virtual machine. The optimization work allows for the isolation of each of the processes, and the ability to execute each process quickly by shifting the bulk of optimization work from load time and/or run time to compile time.

The invention includes a compiler which analyzes its input source code to detect "preservable static fields". Preservable static fields are defined as those fields containing variables which are certain to not be modified by multiple applications concurrently executing in the same environment. Hence, multiple applications can share the preservable static field without any need for additional overhead to protect the preservable static field from the danger associated with concurrent modification of the field by multiple applications (i.e., the applications will remain isolated from one another).

In one embodiment, preservable static fields are read only objects. In one or more other embodiments, the optimization work of the present invention includes detecting preservable static fields of the following types: (i) static final fields of primitive types; (ii) static final fields of type string; and (iii) immutable static (multidimensional) arrays of primitive types. In another embodiment, only static final fields of primitive types are detected. In another embodiment, a tunable parameter is introduced which allows customized optimization of each application depending on the needs of the user. The optimizations of the present invention significantly reduce the performance overhead associated with executing multiple applications in a single environment, such as a Java virtual machine or other suitable environment.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for optimized multiprocessing in a safe language. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Computer Execution Environment (Hardware)

Figure 1:
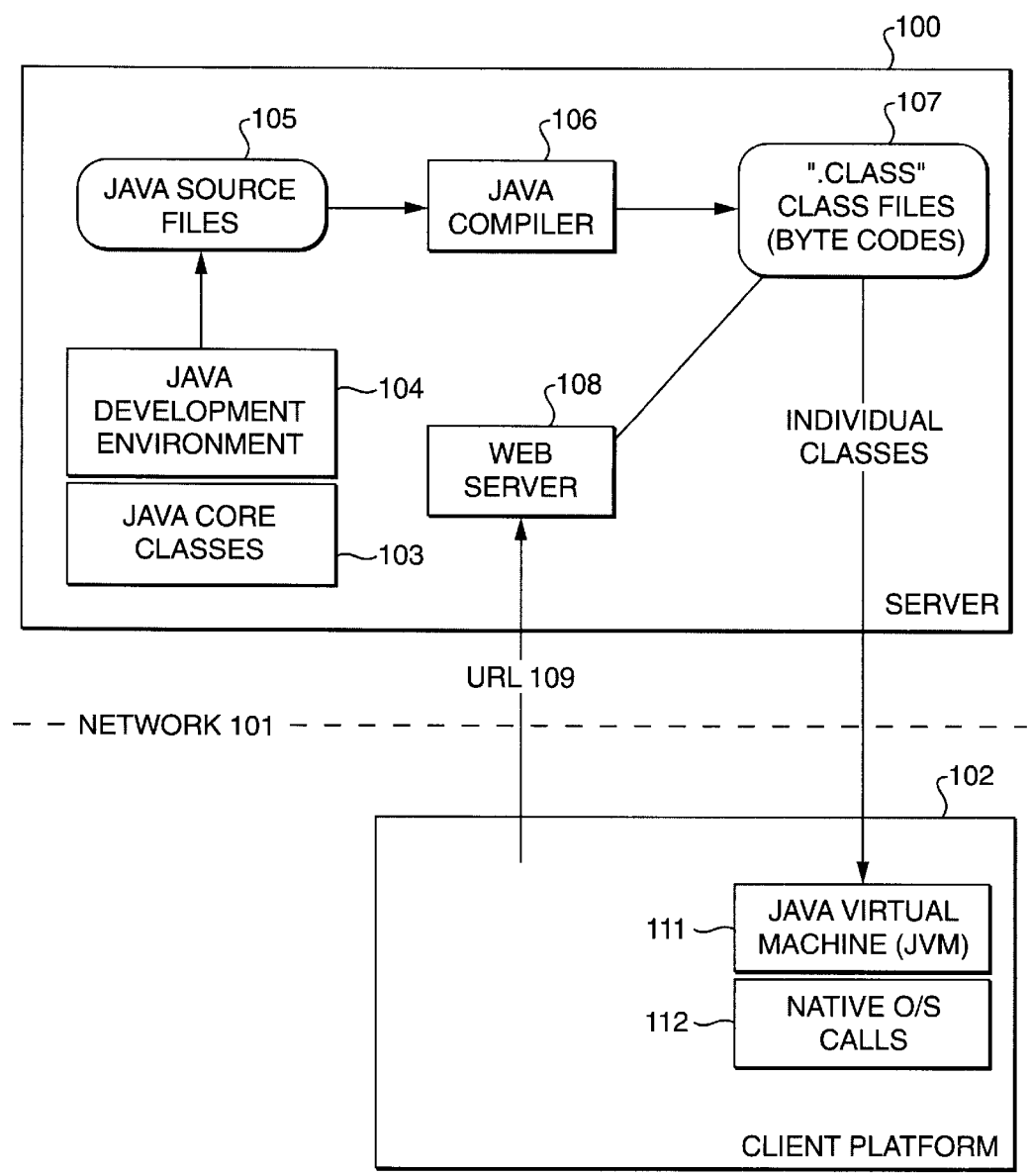
FIG. 1 is an embodiment of a Java network application environment.
Figure 2:
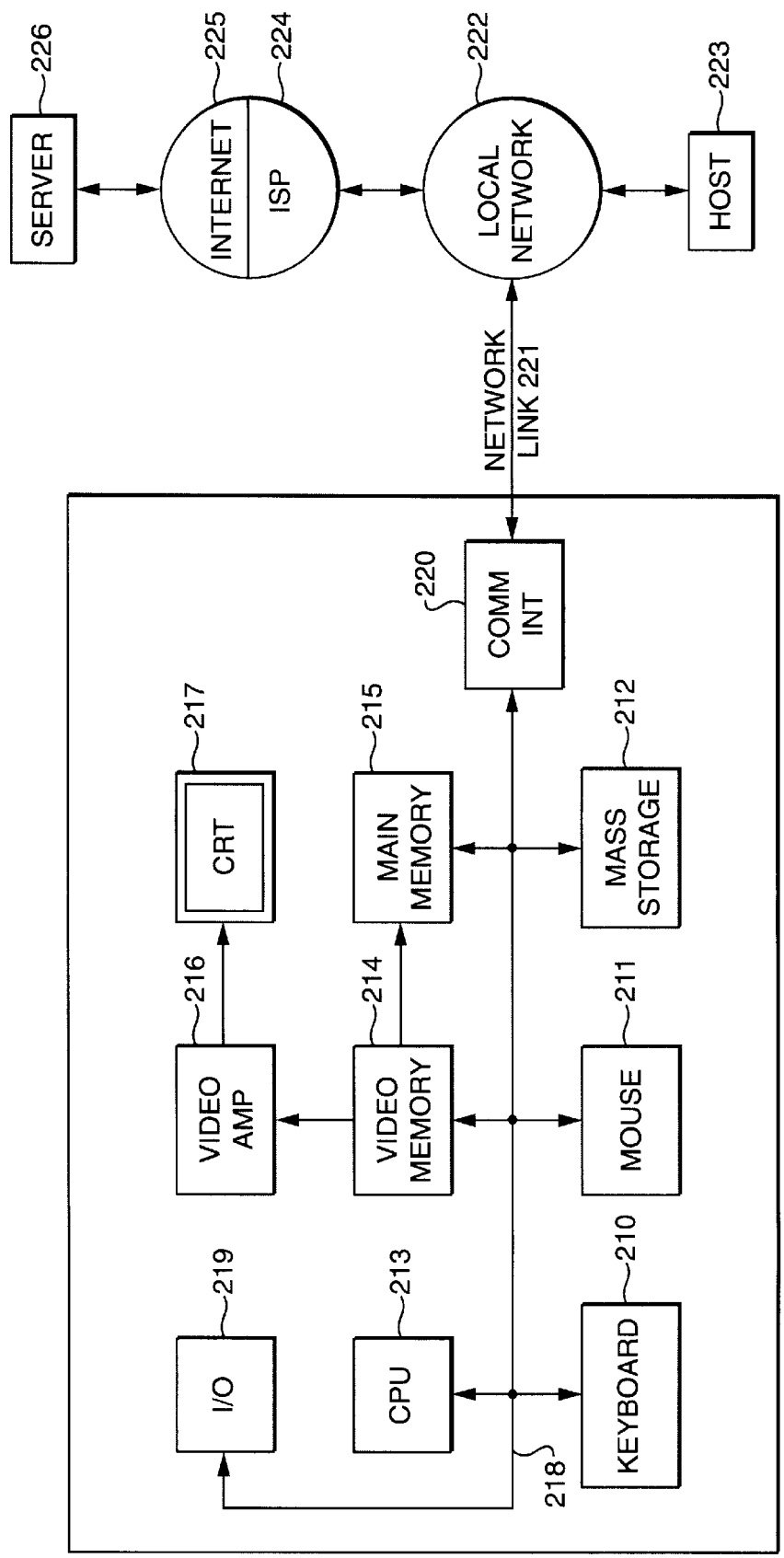
FIG. 2 is a block diagram of an embodiment of a computer system capable of providing a suitable execution environment for an embodiment of the invention.

An embodiment of the invention can be implemented as computer software in the form of computer readable program code executed on a general purpose computer such as computer 200 illustrated in FIG. 2, or in the form of bytecode class files executable within a Java™ run time environment running on such a computer, or in the form of bytecodes running on a processor (or devices enabled to process bytecodes) existing in a distributed environment (e.g., one or more processors on a network). A keyboard 210 and mouse 211 are coupled to a system bus 218. The keyboard and mouse are for introducing user input to the computer system and communicating that user input to central processing unit (CPU) 213. Other suitable input devices may be used in addition to, or in place of, the mouse 211 and keyboard 210. I/O (input/output) unit 219 coupled to bidirectional system bus 218 represents such I/O elements as a printer, A/V (audio/video) I/O, etc.

Computer 200 includes a video memory 214, main memory 215 and mass storage 212, all coupled to system bus 218 along with keyboard 210, mouse 211 and CPU 213. The mass storage 212 may include both fixed and removable media, such as magnetic, optical or magnetic optical storage systems or any other available mass storage technology. Bus 218 may contain, for example, sixty-four address lines for addressing video memory 214 or main memory 215. The system bus 218 also includes, for example, a 64-bit data bus for transferring data between and among the components, such as CPU 213, main memory 215, video memory 214 and mass storage 212. Alternatively, multiplex data/address lines may be used instead of separate data and address lines.

In one embodiment of the invention, the CPU 213 is a SPARC™ microprocessor from Sun Microsystems™, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data links representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data links. The signals through the various networks and the signals on network link 221 and through communication interface 220, which carry the digital data to and from computer 200, are exemplary forms of carrier waves transporting the information.

Computer 200 can send messages and receive data, including program code, in communication networks or a distributed environments, through network link 221, and communication interface 220, for example. In the Internet example, server 226 might transmit a requested code for an application program through Internet 225, ISP 224, local network 222 and communication interface 220.

The received code may be executed by CPU 213 (or other processing units in a distributed environment) as it is received, and/or stored in mass storage 212, or other non-volatile storage for later execution. In this manner, computer 200 may obtain application code in the form of a carrier wave.

The computer systems described above are for purposes of example only. An embodiment of the invention may be implemented in any type of computer system or programming or processing environment.

Phases of the Optimized Architecture

Figure 3:
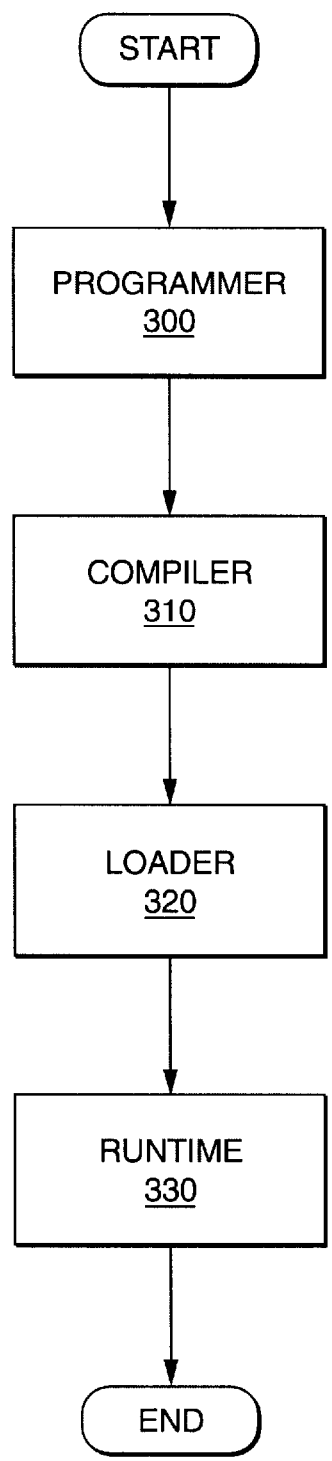
FIG. 3 is flowchart of the optimization architecture phases according to an embodiment of the present invention.

According to one or more embodiments of the present invention, source code generated by a computer programmer, a Java program for instance, is transformed (compiled) into an application which executes on a host computer system, a Java virtual machine for instance. These phases are described in connection with FIG. 3. Step 300 is the programming step, where a computer programmer generates source code. The present invention is designed so that at step 300, the computer programmer is unaware of any modification by the present invention to the compiler-loader-run time architecture with which he or she is familiar. Thus, the invention is transparent and the programmer may continue to generate the source code for applications in an identical manner to the way the programmer generated source code in the prior compiler-loader-run time architecture. At step 310 the compilation phase occurs, where source code generated at step 300 is transformed into output by the modified compiler of the present invention. Step 320, is the loading step. At step 320, the output generated by the modified compiler at step 310 is loaded into a target computer's memory. At step 330, the run time step occurs. The run time step can include, for instance, a Java virtual machine accessing the data provided by the loading step 320, and executing the Java application to a user's desktop.

Modified Compiler

Figure 4:
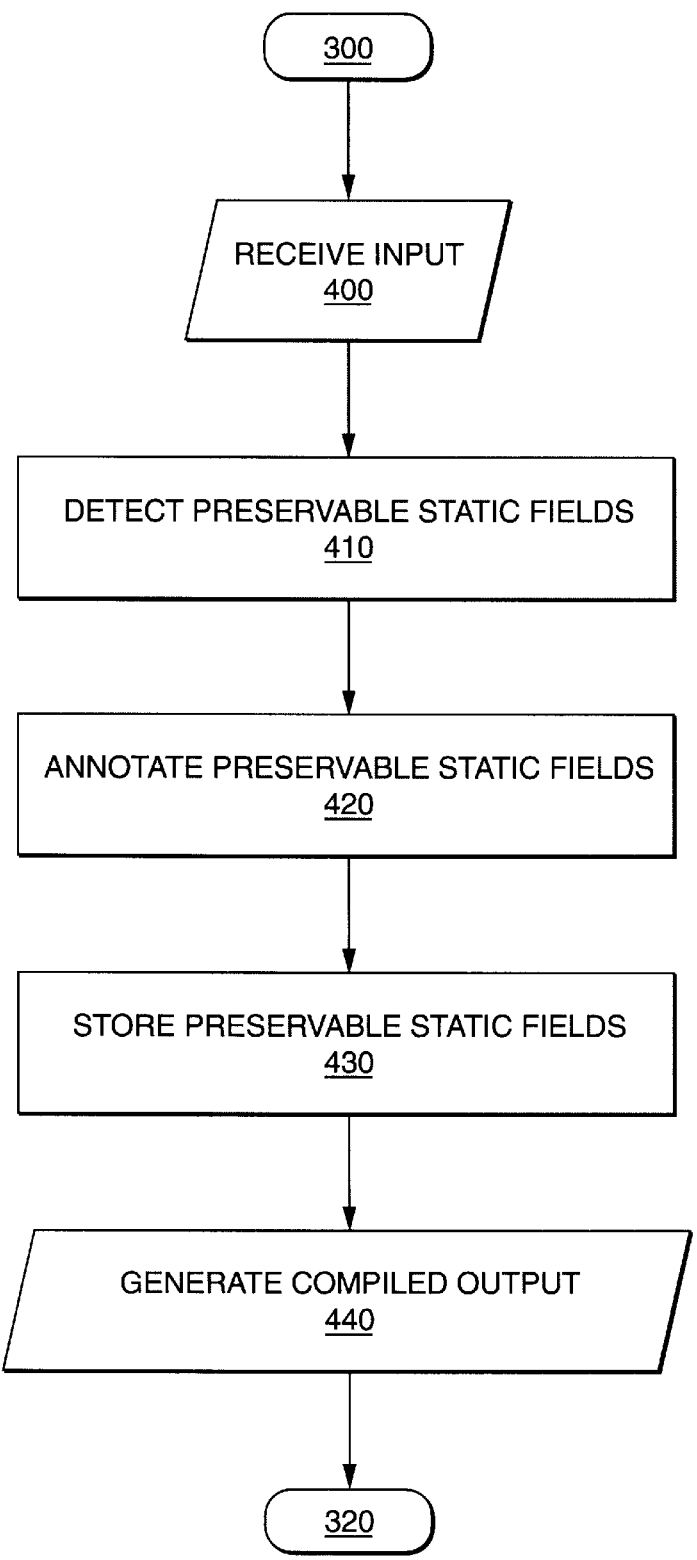
FIG. 4 is a flowchart of the compilation phase according to an embodiment of the present invention.

The modified compiler of the present invention operates in accordance with FIG. 4. The compiler is configured to receive input 400 in the form of source code and analyze the input to detect preservable static fields 410. A static field is preservable if it has a static variable which can remain in its original class and be shared by multiple applications and still allows the multiple applications to be isolated from one another.

Take, for instance, a variable x which is to be held constant in a computer program to the value of 1. In this case, the compiler 310, loader 320, and run time steps 330 will obey this property. X will always have the value 1 and it can stay in its original class because x may be read, but never written to or modified. Therefore, multiple applications may access x without the need for protection of the variable in order to maintain isolation. Thus, it is optimal to identify variables with properties, such as x, and not waste time in the compiler-loader-run time phases protecting such a variable, specifically when the danger of losing the isolation property is nonexistent.

At step 420, the compiler annotates the preservable static fields. The compiler stores the annotated fields at step 430. Thereafter, compilation occurs which generates compiled output 440 including information about the preservable static fields.

Figure 5:
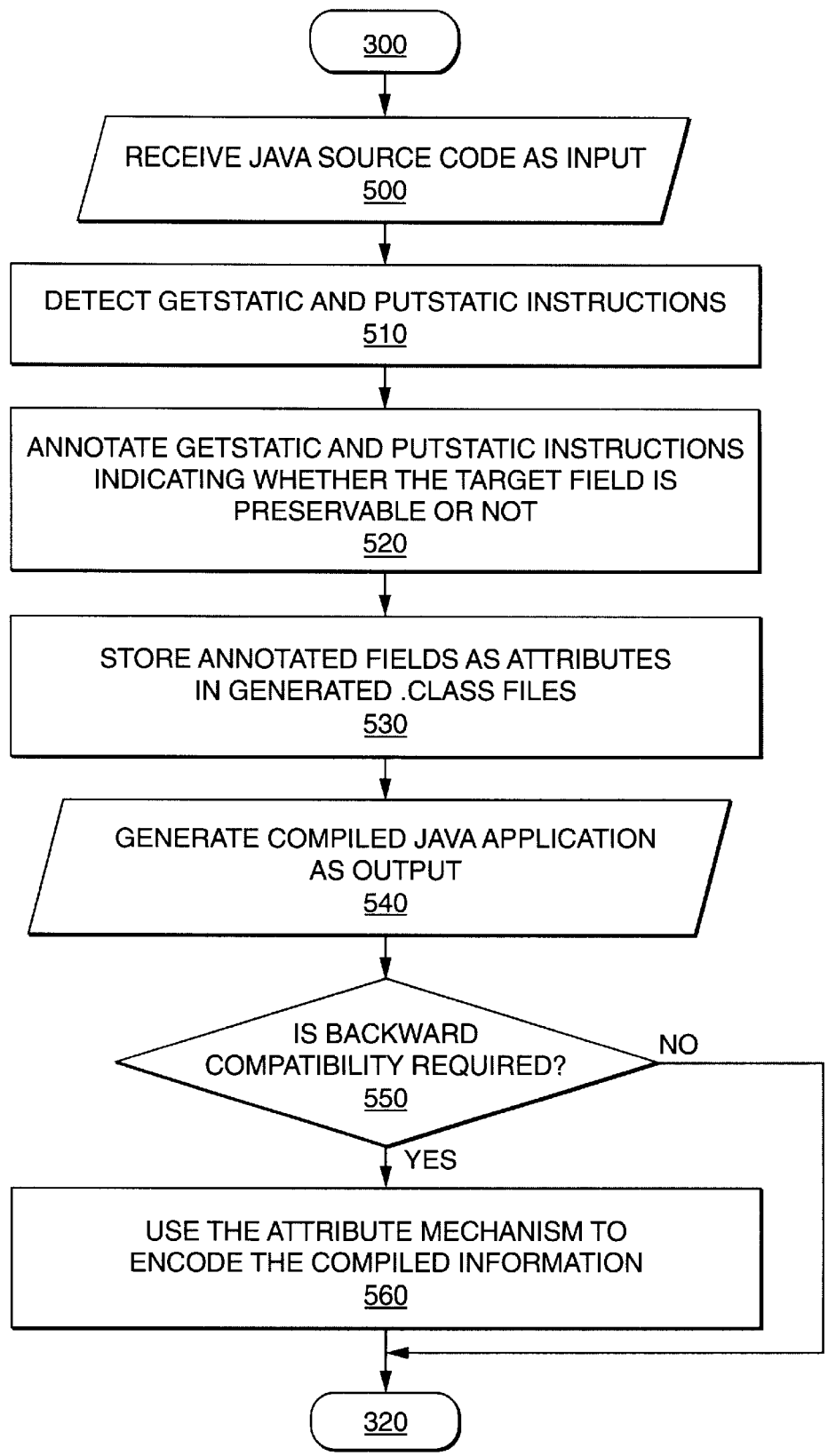
FIG. 5 is a flowchart of the compilation phase according to a Java based embodiment of the present invention.

One or more embodiments of the present invention are configured for optimized multiprocessing in Java. The modified compilation process of these embodiments are described in connection with FIG. 5. At step 500, the modified Java compiler receives Java source code as input produced at step 300. At step 510, the compiler locates getstatic and putstatic instructions in the input. Next, at step 520, the compiler annotates the getstatic and putstatic instructions with the information on whether the target field is preservable or not. At step 530, the annotated fields are stored as attributes in generated class files. Thereafter, the annotated code is compiled at step 540. If backward compatibility is required at step 550, an attribute mechanism is used at step 560 to encode the compiled information, so that the produced code complies with the class format and can be run both by a modified run time (described below) and by the traditional Java virtual machine. Otherwise, compilation is complete at step 540.

Preservable Static Fields

Preservable static fields are read only objects in one embodiment. In another embodiment, the compiler is configured to identify as preservable static fields only the fields of static final primitive types. Detecting only static final primitive types is a simple but effective technique which can cut overhead by fifty percent when running multiple applications in environment, such as a Java virtual machine.

In another embodiment, the following preservable static fields may be detected: (i) static final fields of primitive types; (ii) static final fields of type string; and (iii) immutable static (multidimensional) arrays of primitive types. The invention provides a tunable parameter, which allows a user to choose what fields should be defined as preservable static fields for a given optimization. In what manner the user chooses to designate preservable static fields is analogous to the tradeoff between compilation time and compilation code quality.

Figure 6:
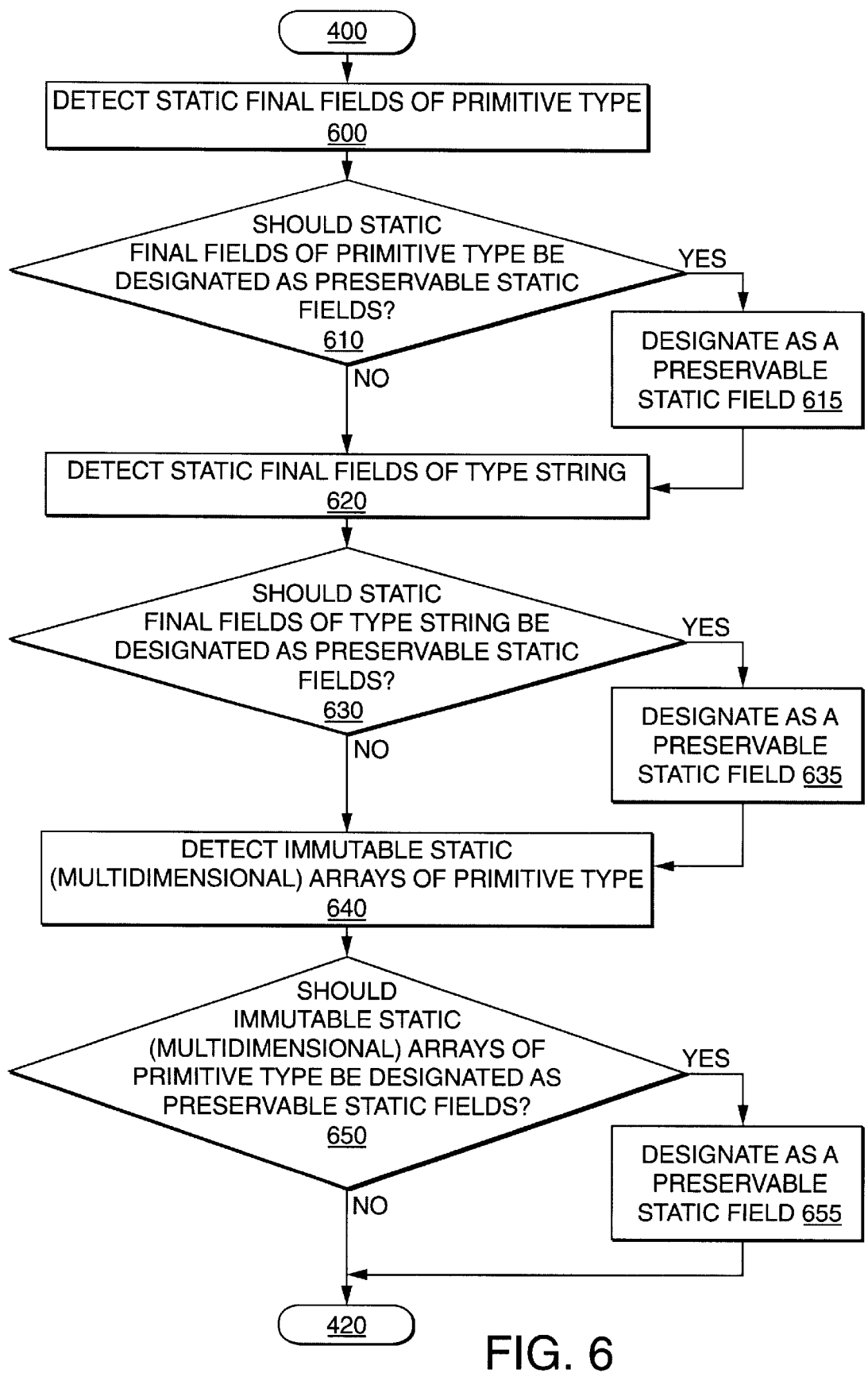
FIG. 6 is a flowchart of the tunable parameter according to one embodiment of the present invention.

The tunable parameter is described in connection with FIG. 6. At step 600, the invention detects static final fields of primitive type. At step 610, the invention determines whether static final fields of primitive type should be designated as preservable static fields. If so, static final fields of primitive type are designated as preservable static fields at step 615. At step 620, the invention detects static final fields of type string. At step 630, the invention determines whether static final fields of type string should be designated as preservable static fields. If so, static final fields of type string are designated as preservable static fields at step 635. At step 640, the invention detects immutable static (multidimensional) arrays of primitive type. At step 650, the invention determines whether immutable static (multidimensional) arrays of primitive type should be designated as preservable static fields. If so, immutable static (multidimensional) arrays of primitive type are designated as preservable static fields at step 655 and the invention proceeds to step 420.

Modified Loader

In U.S. patent application entitled "Small memory footprint system and method for separating application within single virtual machine," Ser. No. 09/513,291 filed on Feb. 25, 2000, Sun Microsystems assigned to the assignee of the present application, and hereby fully incorporated into the present application by reference, a synchronized static method transformation is described, which can be done quickly and efficiently at load time. Synchronized static method transformation should not be performed at compile time because it depends on the existence of per-application monitors, which will not be present in unmodified run times.

Modified Run Time

Figure 7:
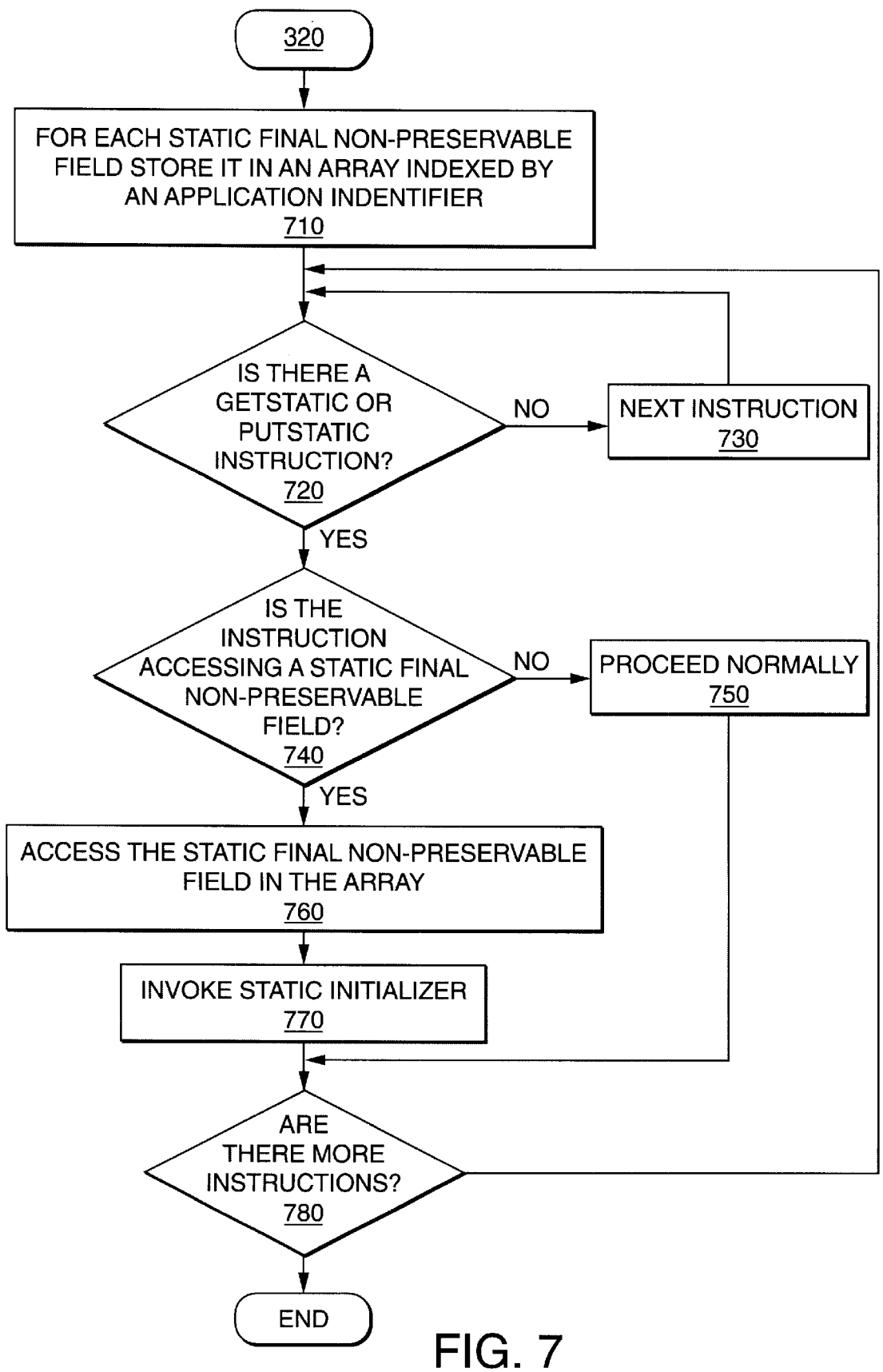
FIG. 7 is a flowchart of modified run time according to one embodiment of the present invention.

Modified run time operates in accordance with FIG. 7. As with a traditional Java virtual machine, classes are laid out in memory, except for static final non-preservable fields. Static final non-preservable fields are placed in a run time maintained array, indexed by an application identifier 710. Implementation of getstatic and putstatic instructions are modified from traditional run time. At step 720, the invention determines if there is a getstatic or putstatic instruction. If there is not, the invention proceeds to the next instruction at step 730. If the instruction is a getstatic or putstatic instruction, the invention determines whether it is a static final non-preservable field at step 740. For non-preservable statics, their values are accessed in the per application arrays at step 760. Static initializers are properly invoked to initialize per-application copies of static fields at step 770. Otherwise, getstatic and putstatic instructions proceed unmodified at step 750. If there are more instructions at step 780, the invention returns to step 720, otherwise run time is complete. Such modified run time can run both the output of the modified compiler, taking advantage of the optimization work performed during the compilation process, as well as Java bytecode produced by ordinary compilers. In the latter case, all fields are implicitly non-preservable.

Thus, a method and apparatus for optimized multiprocessing in a safe language is described in conjunction with one or more specific embodiments. The invention is defined by the claims and their full scope of equivalents.

What is claimed is:

1. A method for optimized execution of source code comprising:

detecting a target field in said source code with a compiler;

annotating said target field prior to compiling to create an annotation indicating weather said field is preservable, comprising annotating at least one selected from the group consisting of a getstatic instruction and a putstatic instruction;

compiling said source code to produce an output using said annotation, wherein said output includes information about said target field;

encoding said output if backward compatibility is required;

loading said output; and executing said output in an environment.

2. The method of claim 1 further comprising:

tuning the detecting of said target field by designating at least one selected from the group consisting of a static final field of primitive type, a static final field of type string, and an immutable static (multidimensional) array of primitive type, as target field variables.

3. The method of claim 1, wherein said source code is JAVA source code.

4. The method of claim 3, wherein said environment is a JAVA virtual machine.

5. The method of claim 1, wherein said annotation is stored in a class file.

6. The method of claim 1, wherein said target field is a read only object.

7. The method of claim 1, wherein encoding comprises using an attribute mechanism and said annotation.

8. A computer program product comprising:

a computer usable medium having computer readable program code embodied therein configured for optimized execution of source code, said computer program product comprising:

computer readable code configured to cause a computer to detect a target field in said source code with a compiler;

computer readable code configured to cause a computer to annotate said target field prior to compiling to create an annotation indicating whether said field is preservable, comprising annotating at least one selected from the group consisting of a getstatic instruction and a putstatic instruction;

computer readable code configured to cause a computer to compile said source code to produce an output using said annotation, wherein said output includes information about said target field;

computer readable code configured to cause a computer to encode said output if backward compatibility is required;

computer readable code configured to cause a computer to load said output; and computer readable code configured to cause a computer to execute said output in an environment.

9. The computer program product of claim 8 further comprising:

computer readable code configured to cause a computer to tune the detecting of said target field by designating at least one selected from the group consisting of a static final field of primitive type, a static final field of type string, and an immutable static (multidimensional) array of primitive type, as target field variables.

10. The computer program product of claim 8, wherein said annotation is stored in a class file.

11. The computer program product of claim 8, wherein said target field is a read only object.

12. The computer program product of claim 8, wherein encoding comprises using an attribute mechanism and said annotation.

* * * * *